(12) United States Patent
Takemoto et al.

(10) Patent No.: US 7,246,404 B2
(45) Date of Patent: Jul. 24, 2007

(54) MOP AND MOP WRINGER

(75) Inventors: Takahira Takemoto, 30-1, Kyoudomari 1-chome, Nagasaki-shi, Nagasaki 851-2211 (JP); Shuji Sugioka, Nagasaki (JP); Tuyoshi Kawazoe, Nisisonogi-gun (JP); Syuuzirou Moritaka, Nagasaki (JP)

(73) Assignee: Takahira Takemoto, Nagasaki (JP)

( * ) Notice: Subject to any disclaimer, the term of this patent is extended or adjusted under 35 U.S.C. 154(b) by 373 days.

(21) Appl. No.: 10/433,567

(22) PCT Filed: Dec. 19, 2001

(86) PCT No.: PCT/JP01/11166

§ 371 (c)(1),
(2), (4) Date: Jun. 5, 2003

(87) PCT Pub. No.: WO02/49493

PCT Pub. Date: Jun. 27, 2002

(65) Prior Publication Data

US 2004/0040114 A1 Mar. 4, 2004

(30) Foreign Application Priority Data

Dec. 19, 2000 (JP) ............................. 2000-404438
Jan. 27, 2001 (JP) ............................. 2001-059245
Sep. 7, 2001 (JP) ............................. 2001-317443
Nov. 9, 2001 (JP) ............................. 2001-382351

(51) Int. Cl.
*A47L 13/14* (2006.01)
(52) U.S. Cl. .......................... 15/261; 15/264
(58) Field of Classification Search .......... 15/261–264, 15/260; 68/24, 271, 22 A, 242; 100/122, 100/125, 131–135
See application file for complete search history.

(56) References Cited

U.S. PATENT DOCUMENTS 694,517 A * 3/1902 Allison ....................... 15/261

(Continued)

FOREIGN PATENT DOCUMENTS

GB 1434169 5/1976

(Continued)

OTHER PUBLICATIONS

Slidable. Dictionary.com. Dec. 13, 2006.*

(Continued)

*Primary Examiner*—Gladys J P Corcoran
*Assistant Examiner*—S Karls
(74) *Attorney, Agent, or Firm*—Wenderoth, Lind & Ponack, L.L.P.

(57) ABSTRACT

A mop having a sponge mop pad is effective for cleaning in a hospital for avoidance of internal infection. In a conventional sponge mop, for washing off dust and dirt sticking to the mop after used for the cleaning, spring force has been used for folding the sponge mop pad at the middle position thereof to squeeze off the water contained in the mop by compression force. This requires a large force and workers, especially women workers, had a difficulty in the cleaning work. In the present invention, the mop having the sponge mop pad comprises a projection and the mop squeezer comprises an insert member into which the projection is inserted. By the principle of lever, the sponge mop pad is easily squeezed by homogenous compression force and predetermined water content of the mop, after squeezed, can be realized.

13 Claims, 20 Drawing Sheets

U.S. PATENT DOCUMENTS

| | | | | |
|---|---|---|---|---|
| 1,140,989 A | * | 5/1915 | Kurtz | 15/262 |
| 2,851,710 A | * | 9/1958 | Leach | 15/1 |
| 4,707,877 A | * | 11/1987 | Griffin | 15/261 |
| 6,523,220 B1 | * | 2/2003 | Lynn | 15/261 |
| 6,560,815 B1 | * | 5/2003 | Brennan et al. | 15/280 |

FOREIGN PATENT DOCUMENTS

| | | |
|---|---|---|
| JP | 26-11384 | 10/1951 |
| JP | 35-22567 | 9/1960 |
| JP | 50-6152 | 1/1975 |
| JP | 57-166131 | 10/1982 |
| JP | 60-86255 | 6/1985 |
| JP | 61-86158 | 6/1986 |
| JP | 2-32222 | 8/1990 |
| JP | 5-211969 | 8/1993 |
| JP | 3083143 | 1/2001 |

OTHER PUBLICATIONS

Utility Model Publication No. 4867/1924 (Eiichi Sugiyama), Nov. 27, 1924.

* cited by examiner

MOP AND MOP WRINGER

FIELD OF THE INVENTION

The present invention relates to a mop to be used for wiping and cleaning a floor etc., especially in a hospital, and a mop squeezer to be used for squeezing water out of the mop after the mop is washed by water.

DESCRIPTION OF RELATED ART

In wiping and cleaning the floor etc. in a hospital, it is especially required to remove the dust and dirt without allowing the dust to rise for avoidance of internal infection like in-hospital infection. Nowadays, it is required to remove the dust and dirt more and more securely and cleanly than in the case using the conventional wiping and cleaning mop.

Thus, the inventors here are currently using such a mop as uses reproduced cellulose sponge (herein referred to as "a swing mop") for effecting a high dust recovery and remarkably reducing the number of sticking bacteria after cleaning so as to be appropriately employed for the abovementioned object.

FIGS. 26 and 27 illustrate the abovementioned swing mop a, wherein FIG. 26 is a perspective view and FIG. 27 is an enlarged side view of a mop portion of the swing mop a.

In FIGS. 26 and 27, reference letters b to m designate parts and components, respectively, as follows:

b: a handle, c: a sliding grip handle, d: a thumb slot,
e: a linkage fit slot, f: a mop handle, g: a metal link rod,
h: a metal squeezing wire, i: a squeezing arm,
j: a handle socket, k: a shroud body, l: a metal paddle,
and m: a sponge mop pad.

In handling the swing mop a, the metal paddle l together with the sponge mop pad m is moved, as shown in FIG. 27. That is, the metal paddle l and the sponge mop pad m attached thereto are usually in the horizontal position, as shown by the two dotted and dash lines. In this state, the sponge mop pad m is wetted and used for wiping the floor.

Thereafter, the sponge mop pad m is washed by wash water in a water tank (not shown). Then, when the water is to be removed from the sponge mop pad m, the sliding grip handle c is pushed down by hand along the mop handle f to thereby move the metal link rod g downward. Thus, the metal squeezing wires h, and the squeezing arms i, both rotatably linked to the metal link rod g, rotate swingingly, as shown by arrows in FIG. 27, against a spring force of a spring (not shown), so that the metal paddle l and the sponge mop pad m rotate to the vertical direction from the horizontal direction. Thereby, the sponge mop pads m, m (the left hand half and the right hand half in the figure) are folded together against each other and the water is squeezed off.

As this swing mop a is of such a type that the sponge mop pad m is doubled at its mid position, a large physical power is required therefor so that the power of workers performing the cleaning in a hospital etc., especially in case of female workers, is often not sufficient and a countermeasure to enable squeezing which requires less power has been desired.

Thus, a simplified type of the above swing mop a is recently available in which the metal link rod g is eliminated and the metal squeezing wires h, and the arms i, are rotated downward so that the sponge mop pads m are folded. In this type of mop, however, the water squeezing still requires a large physical power and a further improvement thereof is desired.

Also, in the swing mop a, folding of the sponge mop pad m is repeated to thereby cause a severe deterioration of the pad and a countermeasure therefor has been desired.

Moreover, in the swing mop a, when the sponge mop pad m is folded, the pressing force acting on the mutually opposed portions of the sponge mop pads m differs in the vertical direction in FIG. 27 or in the longitudinal direction of the sponge mop pads mafter being folded. The water content in the sponge mop pads mafter being squeezed is not homogenous, which causes an irregularity in wiping the floor. Hence, a countermeasure to ensure a homogenous water content in the sponge mop pads m to be used for wiping the floor has been desired.

BRIEF SUMMARY OF THE INVENTION

A first aspect of the present invention provides a mop and mop squeezer unit, the mop being fitted with a sponge mop pad, the mop squeezer squeezing wash water contained in the sponge mop pad. The mop and mop squeezer unit comprise an insert body provided in one of the mop and the mop squeezer, a fit member, to which the insert body is fitted, provided in the other of the mop and the mop squeezer, a receiver plate arranged below the insert body or the fit member in the mop squeezer and a movable mechanism that is rotatable so as to change a gap between the insert body or the fit member and the receiver plate.

A second aspect of the present invention provides a mop and mop squeezer unit in which a spring is provided between the insert body or the fit member and the receiver plate.

A third aspect of the present invention provides a mop squeezer squeezing wash water contained in a sponge mop pad that is attached to a rigid body of a mop. The mop squeezer comprises a receiver plate arranged in the mop squeezer. A fulcrum is formed that makes contact with at least one point of the rigid body to which the sponge mop pad is attached, and a gap between the fulcrum and the receiver plate is changeable.

A fourth aspect of the present invention provides a mop squeezer in which the fulcrum is formed on a presser plate. A strut for forming a gap between the receiver plate and the presser plate is provided passing through the receiver plate and the presser plate and an elastic member is provided at portions of the strut that pass through the receiver plate and the presser plate.

A fifth aspect of the present invention provides a mop squeezer in which the mop squeezer comprises a cylindrical member on which the receiver plate is placed.

A sixth aspect of the present invention provides a mop squeezer in which the cylindrical member is rotatable.

A seventh aspect of the present invention provides a mop squeezer squeezing wash water contained in a mop, characterized in that the mop squeezer is provided above a water tank for receiving the wash water that is squeezed off by the mop squeezer.

An eighth aspect of the present invention provides a mop squeezer squeezing wash water contained in a mop, characterized in that the mop squeezer has a function to be detachably mounted on a strut provided above a water tank for receiving the wash water that is squeezed off by the mop squeezer.

A ninth aspect of the present invention provides a mop squeezer squeezing wash water contained in a mop, characterized in that the mop squeezer has a function to be detachably mounted on a strut, the strut at one portion being fixed to a carriage, on which a water tank receiving the wash water that is squeezed off by the mop squeezer is placed, and at another portion being provided above the water tank.

A tenth aspect of the present invention provides a mop squeezer, comprising a presser member provided in a framework of the mop squeezer and a receiver plate rotatably arranged below the presser member in the framework so that a gap between the presser member and the receiver plate is smaller than a thickness of a mop that is applied to the mop squeezer.

An eleventh aspect of the present invention provides a mop squeezer comprising a presser member provided in a framework of the mop squeezer and a receiver plate rotatably arranged below the presser member in the framework so that a gap between the presser member and the receiver plate is smaller than a thickness of a mop that is applied to the mop squeezer.

A twelfth aspect of the present invention provides a mop squeezer, comprising a strut fitted to each of two frame members of the mop squeezer so that an acute angle is formed between the strut and the frame member, a presser member fixed between the struts and a receiver plate rotatably arranged between the frame members below the presser member so that a gap between the presser member and the receiver plate is smaller than a thickness of a mop that is applied to the mop squeezer.

A thirteenth aspect of the present invention provides a mop squeezer, comprising a strut rotatably fitted to each of two frame members of the mop squeezer so that, in a stationary position of the mop squeezer, substantially zero angle and an acute angle are formed between the strut and the frame member, a presser member fixed between the struts and a receiver plate rotatably arranged between the frame members below the presser member so that a gap between the presser member and the receiver plate is smaller than a thickness of a mop that is applied to the mop squeezer.

A fourteenth aspect of the present invention provides a mop squeezer in which the frame members have their lower end portions connected to each other via a lower frame fixing member, the struts have their lower end portions connected to each other via a lower strut fixing member and the frame members and the struts are connected to each other via a hinge mechanism.

A fifteenth aspect of the present invention provides a mop squeezer, comprising a strut fitted to each of two frame members of the mop squeezer so that an acute angle is formed between the strut and the frame member, a presser piece fixed to each of the struts and a receiver plate rotatably arranged between the frame members below the presser pieces so that a gap between the presser pieces and the receiver plate is smaller than a thickness of a mop that is applied to the mop squeezer.

A sixteenth aspect of the present invention provides a mop squeezer, characterized in comprising a strut rotatably fitted to each of two frame members of the mop squeezer so that, in a stationary position of the mop squeezer, substantially zero angle and an acute angle are formed between the strut and the frame member, a presser piece fixed to each of the struts and a receiver plate rotatably arranged between the frame members below the presser pieces so that a gap between the presser pieces and the receiver plate is smaller than a thickness of a mop that is applied to the mop squeezer.

A seventeenth aspect of the present invention provides a mop squeezer as mentioned in the sixteenth invention, characterized in that the frame members have their lower end portions connected to each other via a lower frame fixing member, the struts have their lower end portions connected to each other via a lower strut fixing member and the frame members and the struts are connected to each other via a hinge mechanism.

BRIEF DESCRIPTION OF THE DRAWINGS

FIG. 4 is a front view of a mop with sponge of the first embodiment, wherein FIG. 4 is also a front view of a mop with sponge of a second embodiment according to the present invention shown in FIG. 7.

DETAILED DESCRIPTION OF THE PREFERRED EMBODIMENTS

Herebelow, the present invention will be described more concretely based on embodiments according to the present invention with reference to the appended figures.

Figure 1:
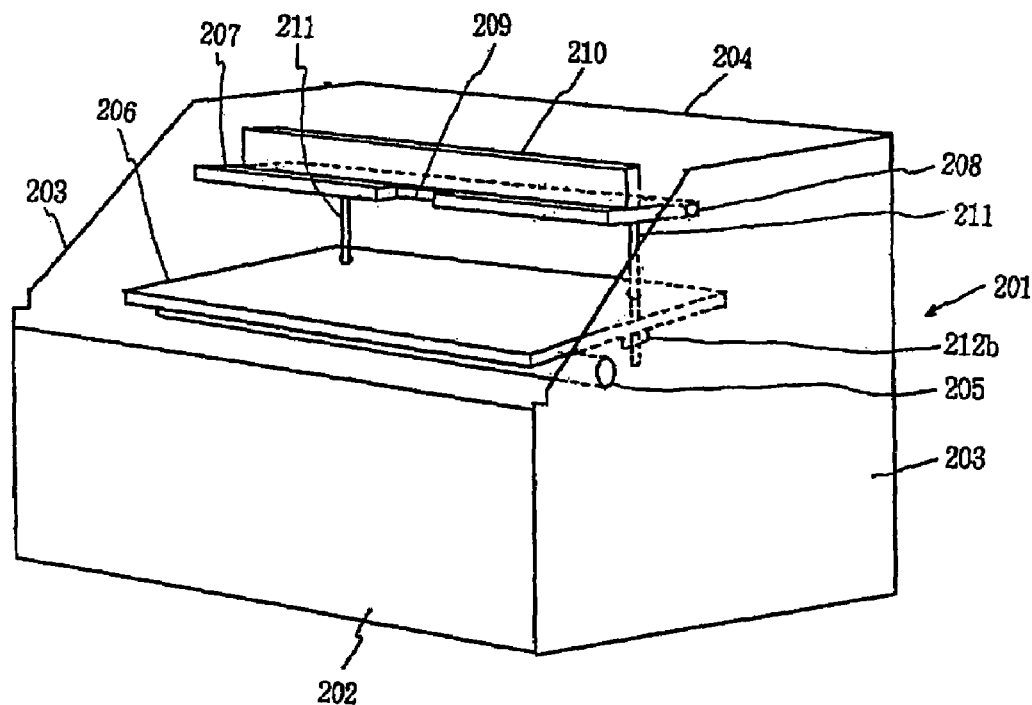
FIG. 1 is a perspective view of a water tank of a first embodiment according to the present invention.
Figure 2:
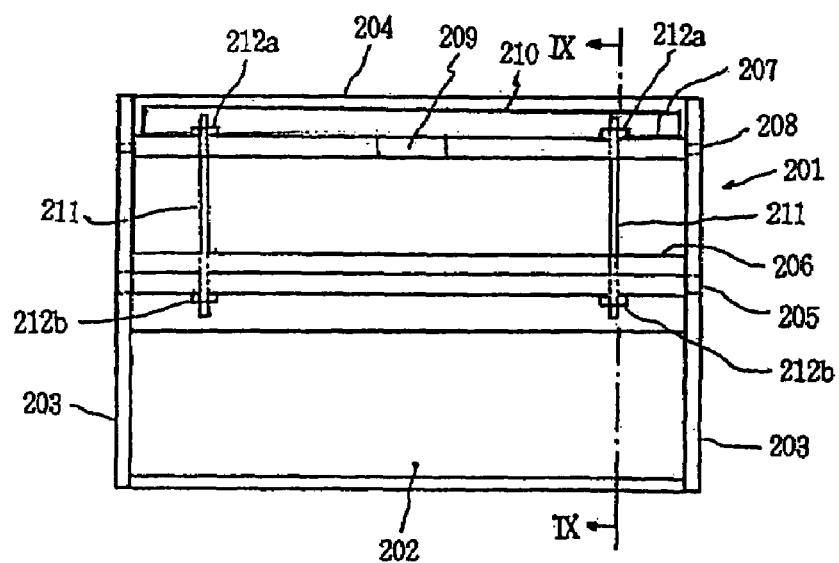
FIG. 2 is a front view of the water tank of FIG. 1.
Figure 3:
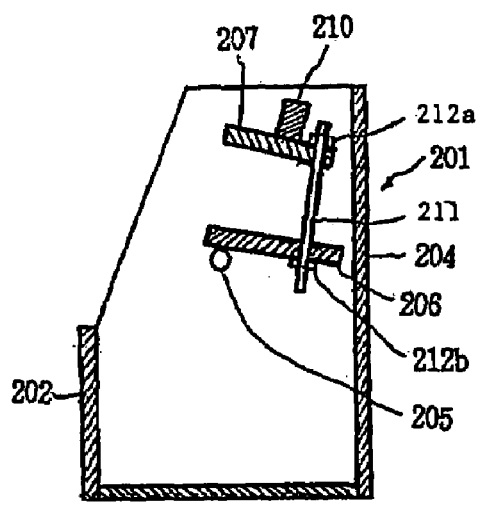
FIG. 3 is a cross sectional side view of the water tank of FIG. 1.
Figure 4:
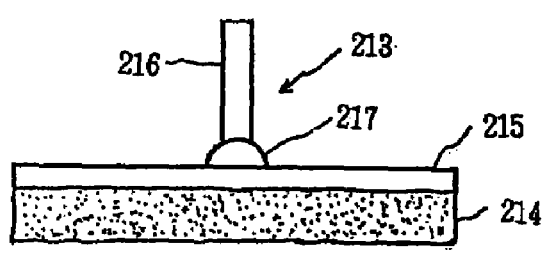
Figure 5:
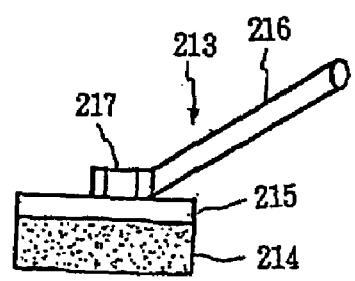
FIG. 5 is a side view of the mop with sponge of FIG. 4.
Figure 6:
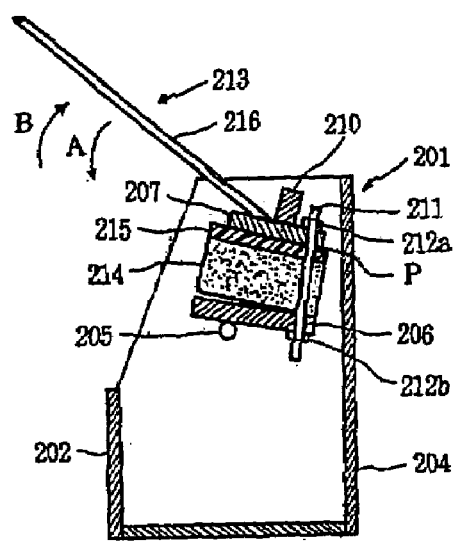
FIG. 6 is a function explanatory view of the first embodiment.

Next, FIGS. 1 to 10 illustrate a first and a second embodiment according to the present invention. FIGS. 1 to 6 show the first embodiment, wherein FIG. 1 is a perspective view, FIG. 2 is a front view, FIG. 3 is a cross sectional side view taken on line IX-IX of FIG. 2 and seen in the direction of arrows, FIG. 4 is a front view of a mop with sponge of the first embodiment, FIG. 5 is a side view of the mop of FIG. 4 and FIG. 6 is a function explanatory view of the first embodiment.

In FIGS. 1 to 3, numeral 201 designates a box-like water tank that has its upper surface opened and stores therein wash water (not shown). Numeral 202 designates a front plate of the water tank 201, numerals, 203 designate side plates of the water tank 201 and numeral 204 designates a rear plate of the water tank 201. Numeral 205 designates a cylindrical member that is provided between the side plates 203. This cylindrical member 205 may be provided either fixedly or rotatably. Numeral 206 designates a receiver plate that is placed on the cylindrical member 205. Numeral 207 designates a presser plate that is provided between the side plates 203 with an appropriate gap kept above the receiver plate 206. Numeral 208 designates a shaft that is provided projecting from both side end faces of the presser plate 207 to be rotatably supported to the side plates 203. Numeral 209 designates a cut portion that is provided at a front peripheral central position of the presser plate 207. Numeral 210 designates a reinforcing plate that is fixed to an upper surface of the presser plate 207. Numerals 211 designate struts that support the presser plate 207 and the receiver plate 206. Numerals 212a, 212b designate an upper nut and a lower nut, respectively, that adjustably form a length of the strut 211 between the presser plate 207 and the receiver plate 206. The length of the struts 211 between a lower surface of the presser plate 207 and an upper surface of the receiver plate 206 is adjusted by the position of the upper nut 212a or the lower nut 212b so as to be appropriately smaller than a thickness of a sponge mop pad 214 and a metal plate 215 fixedly supporting the sponge mop pad 214, as shown in FIGS. 4 and 5. That is, the minimum gap between the lower surface of the presser plate 207 and the upper surface of the receiver plate 206 is set to such a size as realizes an appropriate thickness of the sponge mop pad 214 by the compression. In FIGS. 4 and 5, numeral 217 designates a fixing lever that fixes a mop handle 216 to the metal plate 215.

In the first embodiment constructed as mentioned above, the length of the strut 211 between the presser plate 207 and the receiver plate 206 is first adjusted beforehand by the position of the upper nut 212a or the lower nut 212b so as to be slightly smaller than the thickness of the sponge mop pad 214 and the metal plate 215. The sponge mop pad 214 of the mop with sponge 213 is immersed into the wash water in the water tank 201 and the sticking dust and dirt of the sponge mop pad 214 are washed off. Then, as shown in FIG. 6, the sponge mop pad 214 together with the metal plate 215 of the mop with sponge 213 is inserted into the gap between the presser plate 207 and the receiver plate 206 and subsequently the mop handle 216 is rotated in the direction of arrow A in FIG. 6. Thus, the metal plate 215 is rotated in the direction of arrow A around a fulcrum line P in FIG. 6. This fulcrum line P is generated in a contact face between a front end portion of the metal plate 215 and a rear end portion of the presser plate 207. Thereby, the sponge mop pad 214 is compressed between the metal plate 215 and the receiver plate 206 so that the water contained in the sponge mop pad 214 is squeezed off to be appropriately adjusted for wiping the floor. The squeezed water falls down flowing through a plurality of drain holes (not shown) bored in the receiver plate 206 or flowing aside the receiver plate 206 to be stored in the water tank 201.

Then, the mop handle 216 is rotated in the direction of arrow B in FIG. 6 and the sponge mop pad 214 together with the metal plate 215 is pulled out of the gap between the presser plate 207 and the receiver plate 206, so that the mop with sponge is ready for the next wiping and cleaning.

Figure 7:
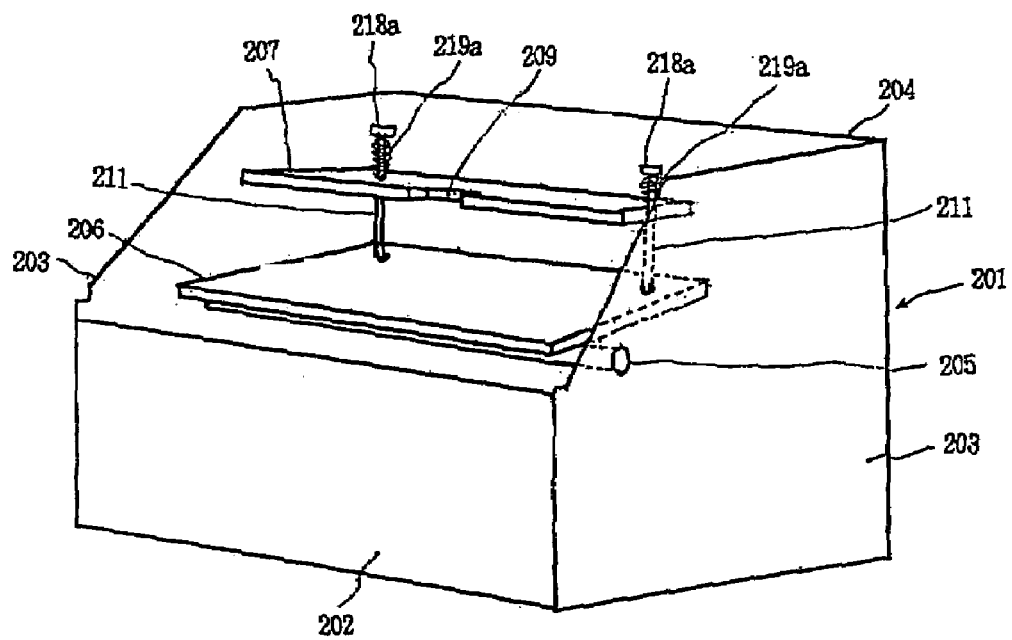
FIG. 7 is a perspective view of a water tank of the second embodiment.
Figure 8:
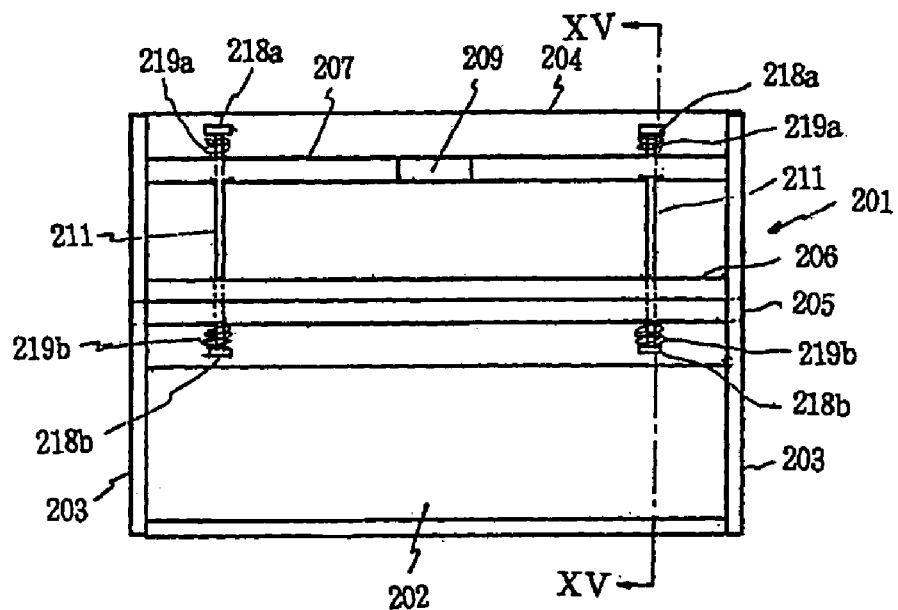
FIG. 8 is a front view of the water tank of FIG. 7.
Figure 9:
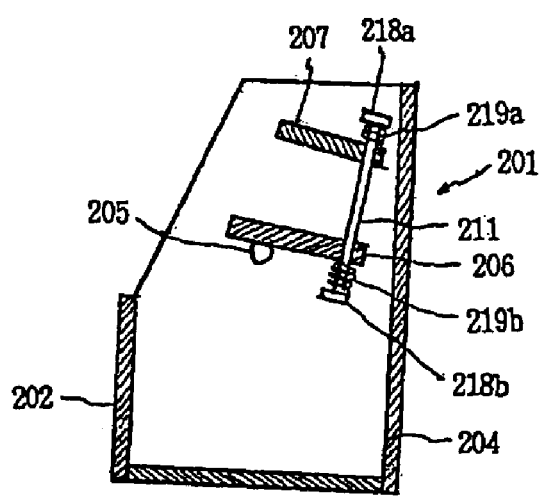
FIG. 9 is a cross sectional side view of the water tank of FIG. 7.
Figure 10:
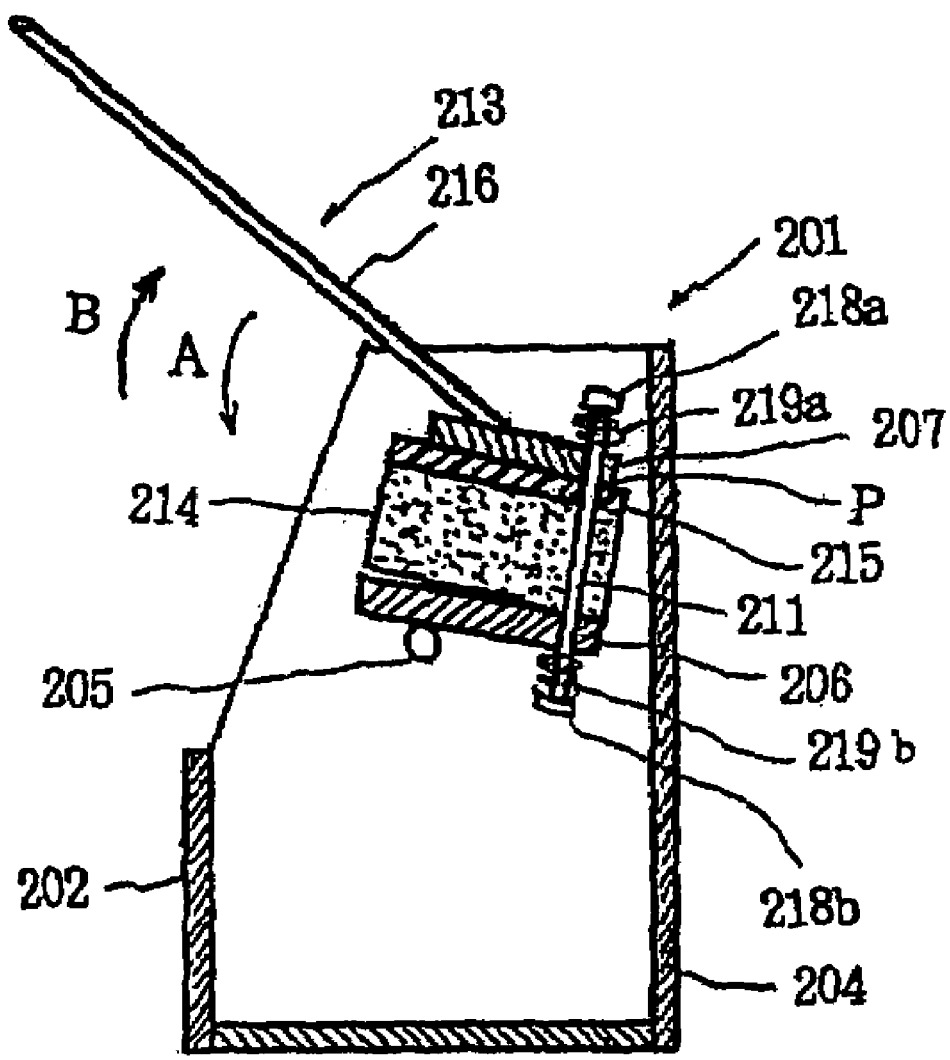
FIG. 10 is a function explanatory view of the second embodiment.

FIGS. 7 to 10 show the second embodiment, wherein FIG. 7 is a perspective view, FIG. 8 is a front view, FIG. 9 is a cross sectional side view taken on line XV-XV of FIG. 8 and seen in the direction of arrows and FIG. 10 is a function explanatory view of the second embodiment. As the reference numerals 201 to 207, 209 and 211 to 215 in FIGS. 7 to 10 designate the same parts and components, respectively, as those shown in FIGS. 1 to 6, repeated description thereof will be omitted.

In FIGS. 7 to 10, numeral 218a designates an upper swell that is provided at an upper end of the strut 211 passing through the presser plate 207 and numeral 218b designates a lower swell that is provided at a lower end of the strut 211 passing through the receiver plate 206. Numeral 219a designates an upper spring that is provided between the upper swell 218a and an upper surface of the presser plate 207 and numeral 219b designates a lower spring that is provided between the lower swell 218b and a lower surface of the receiver plate 206. If the strut 211 is separated into two parts at a middle position thereof, then a single spring may be provided between these two parts.

In the second embodiment constructed as mentioned above, the sponge mop pad 214 of the mop with sponge 213 is immersed into wash water (not shown) in the water tank 201 and the sticking dust and dirt of the sponge mop pad 214 are washed off. Then, as shown in FIG. 10, the sponge mop pad 214 together with the metal plate 215 of the mop with sponge 213 is inserted into the gap between the presser plate 207 and the receiver plate 206 and subsequently the mop handle 216 is rotated in the direction of arrow A in FIG. 10 against the spring force of the upper springs 219a and the lower springs 219b. Thus, the metal plate 215 is rotated in the direction of arrow A around a fulcrum line P in FIG. 10. This fulcrum line P is generated in a contact face between a front end portion of the metal plate 215 and a rear end portion of the presser plate 207. Thereby, the sponge mop pad 214 is compressed between the metal plate 215 and the receiver plate 206 so that the water contained in the sponge mop pad 214 is squeezed off to be appropriately adjusted for wiping the floor. The squeezed water falls down flowing through a plurality of drain holes (not shown) bored in the receiver plate 206 or flowing aside the receiver plate 206 to be stored in the water tank 201.

Then, the mop with sponge 202 is pulled out of the gap between the presser plate 207 and the receiver plate 206 and the presser plate 207 is rotated in the direction of arrow B in FIG. 9 by the spring force of the upper springs 219a and the lower springs 219b.

Figure 11:
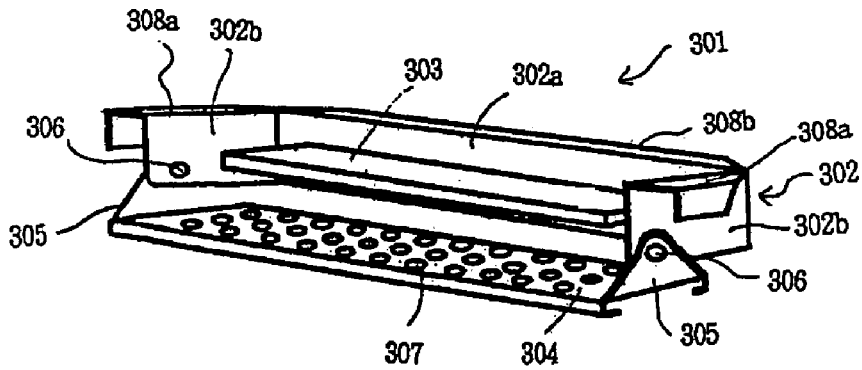
FIG. 11 is a perspective view of a mop squeezer of a third embodiment according to the present invention.
Figure 12:
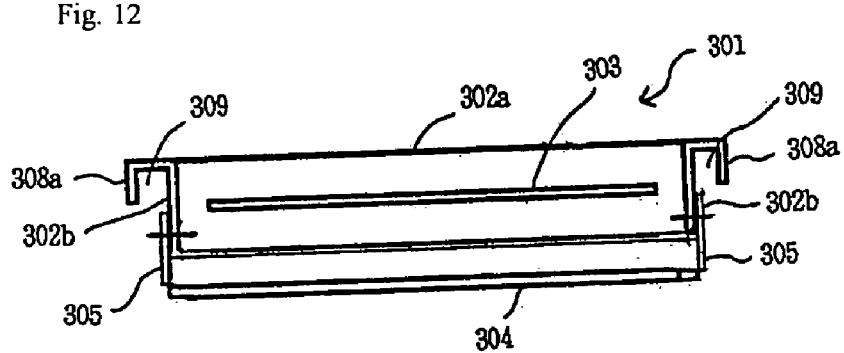
FIG. 12 is a front view of the mop squeezer of FIG. 11.
Figure 13:
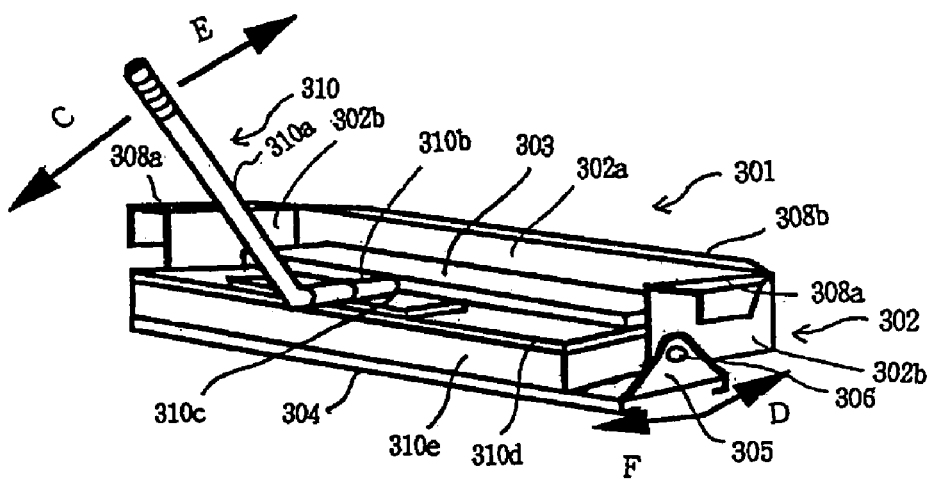
FIG. 13 is a function explanatory view of the third embodiment.
Figure 14:
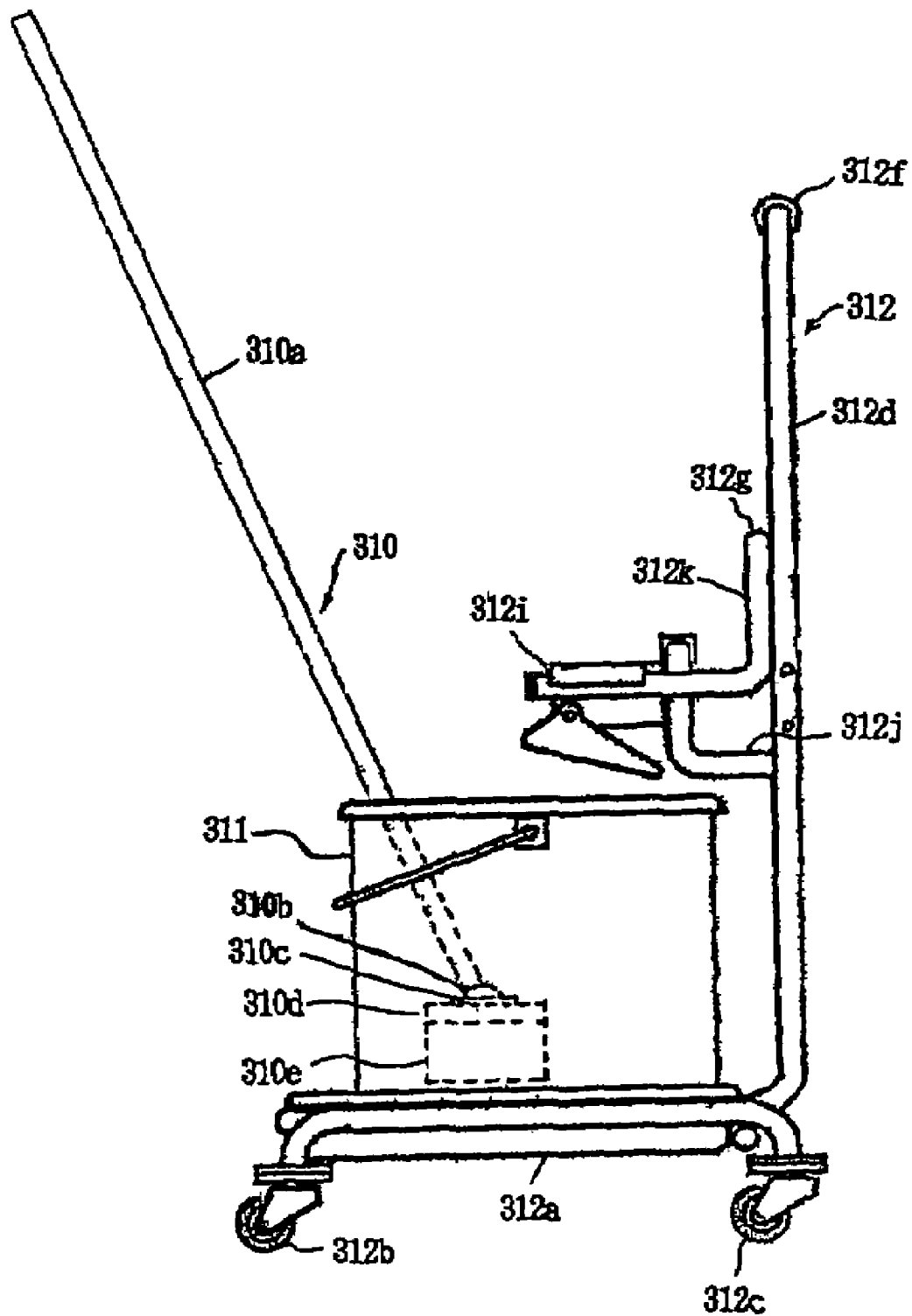
FIG. 14 is a side view of the mop squeezer of FIG. 11 showing the state where the mop squeezer is mounted on a carriage.
Figure 15:
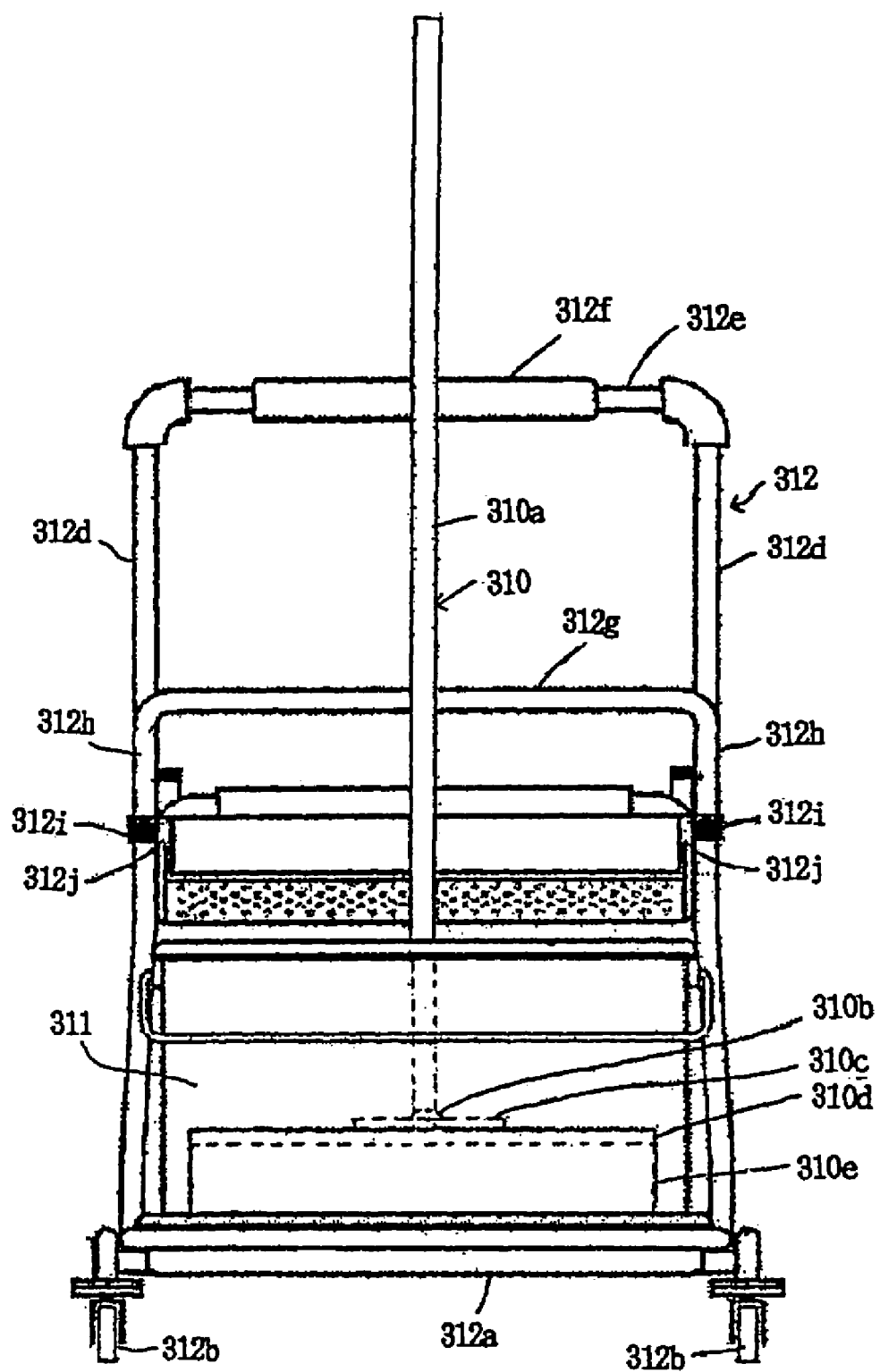
FIG. 15 is a front view of the mop squeezer of FIG. 14.
Figure 16:
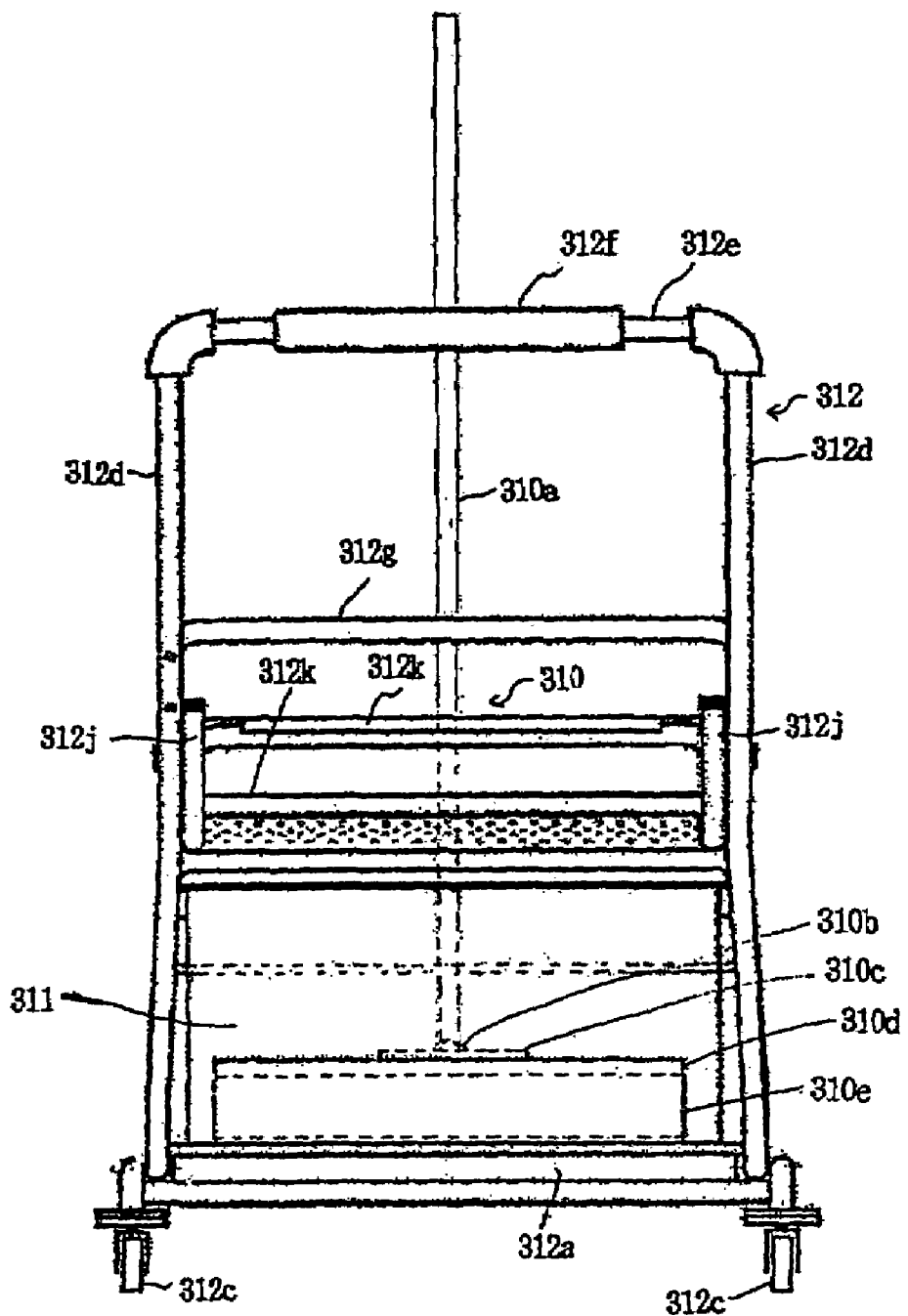
FIG. 16 is a rear view of the mop squeezer of FIG. 14.

FIGS. 11 to 16 illustrate a third embodiment, wherein FIG. 11 is a perspective view of a mop squeezer of the third embodiment, FIG. 12 is a front view of the mop squeezer, FIG. 13 is a function explanatory view of the mop squeezer in which a mop with sponge is inserted into the mop squeezer to thereby squeeze wash water or dirty water contained in a sponge mop pad, FIG. 14 is a side view showing the state where the mop squeezer is mounted on a strut, FIG. 15 is a front view of the mop squeezer of FIG. 14 and FIG. 16 is a rear view of the mop squeezer of FIG. 14.

In FIGS. 11 to 16, numeral 301 designates the mop squeezer, numeral 302 designates a frame of a cross sectional C-shape of the mop squeezer that has its upper and lower surface portions opened and comprises a rear plate 302a and side plates 302b. Numeral 303 designates a presser plate that is fixed between the side plates 302b. It is to be noted that the presser plate 303 may have its both side ends fixed to the side plates 302b or may have its both side ends not fixed to the side plates 302b but fixed to the rear plate 302a of the frame 302, as shown in FIG. 12. Numeral 304 designates a receiver plate that has both side ends fitted with frame suspending plates 305 of a substantially triangular shape so as to be rotatable around pins 306. Numeral 307 designates a plurality of holes that are bored in the receiver plate 304. Numerals 308a designate frame suspending formed members that extend from the side plates 302b of the frame 302 and form grooves 309. Numeral 308b designates a frame suspending formed member that extends from the rear plate 302a of the frame 302 and forms a groove (not shown). As for the frame suspending formed members, 308a and 308b, both of them may be provided or either of them may be provided. A mop with sponge 310 is such one as shown in FIG. 13, wherein numeral 310a designates a handle and numeral 310b designates a fixing lever that fixes a fixing plate 310c to the handle 310a. Numeral 310d designates a metal plate, to which a sponge mop pad 310e is bonded via a double coated adhesive tape, etc.

A water tank 311 is placed on a bottom plate 312a of a carriage 312, as shown in FIGS. 14 to 16. The carriage 312 comprises four casters, that is, two casters 312b on the front side and two casters 312c on the rear side. The carriage 312 is fixed with two upwardly extending struts 312d that have their upper ends connected to each other via an upper strut 312e. The upper strut 312e, at which the workers push the carriage 312, is covered with a rubber tube 312f, etc. so as to be friendly to the workers. Numeral 312g designates a middle strut that is fixed to a middle position of the struts 312d and has both ends extending downward to form vertical struts 312h. The vertical struts 312h have their ends bent substantially orthogonally to further extend to form suspending struts 312i. Between the suspending struts 312i and the struts 312d, L-shaped reinforcing struts 312j are provided as reinforcing members. Also, between the reinforcing struts 312j, upper and lower horizontal reinforcing struts 312k are provided.

In the third embodiment constructed as mentioned above, the sponge mop pad 310e of the mop with sponge 310 is immersed into wash water (not shown) in the water tank 311, as shown in FIGS. 14 to 16, and the sticking dust and dirt of the sponge mop pad 310e are washed off. Then, as shown in FIG. 13, the sponge mop pad 310e together with the metal plate 310d of the mop with sponge 310 is inserted into the gap between the presser plate 303 and the receiver plate 304 and subsequently the mop handle 310a is rotated in the direction of arrow C in FIG. 13. Thus, the receiver plate 304 is rotated in the direction of arrow D around the pins 306 via the frame suspending plates 305. Thereby, the gap between the presser plate 303 and the receiver plate 304 becomes narrower so that the sponge mop pad 310e is compressed and the water contained in the sponge mop pad 310e is squeezed off to be appropriately adjusted for wiping the floor. The squeezed water falls down flowing through a plurality of holes 307 bored in the receiver plate 304 or flowing aside the receiver plate 304 to be stored in the water tank 311.

Then, the handle 310a is rotated in the direction of arrow E in FIG. 13 to thereby rotate the receiver plate 304 in the direction of arrow F around the pins 306 via the frame suspending plates 305. Thereby, the gap between the presser plate 303 and the receiver plate 304 becomes larger so that the mop with sponge 310 can be easily pulled out. Thus, the mop with sponge 310 is removed out of the mop squeezer 301 to be ready for the next wiping.

In this case, a considerable force is required to move the handle 310a in the direction of arrow C in FIG. 13 for squeezing the wash water contained in the sponge mop pad 310e.

In the conventional case, it has been necessary to design the water tank so that it has an enough strength for withstanding a strong force added to the handle 310a. In the present embodiment, however, the strong force added to the handle 310a is conveyed to the entire carriage 312 via the suspending struts 312i. Thus, it is not necessary to make the water tank 311 strengthened so as to withstand the strong force added to the handle 310a.

The present embodiment is not limited to the examples illustrated in FIGS. 11 to 16 but can be applied to general mop squeezers having such mops as made by cloths or cloth fibers.

A mop squeezer of a fourth embodiment according to the present invention will be described with reference to FIGS. 17 to 19.

Figure 17:
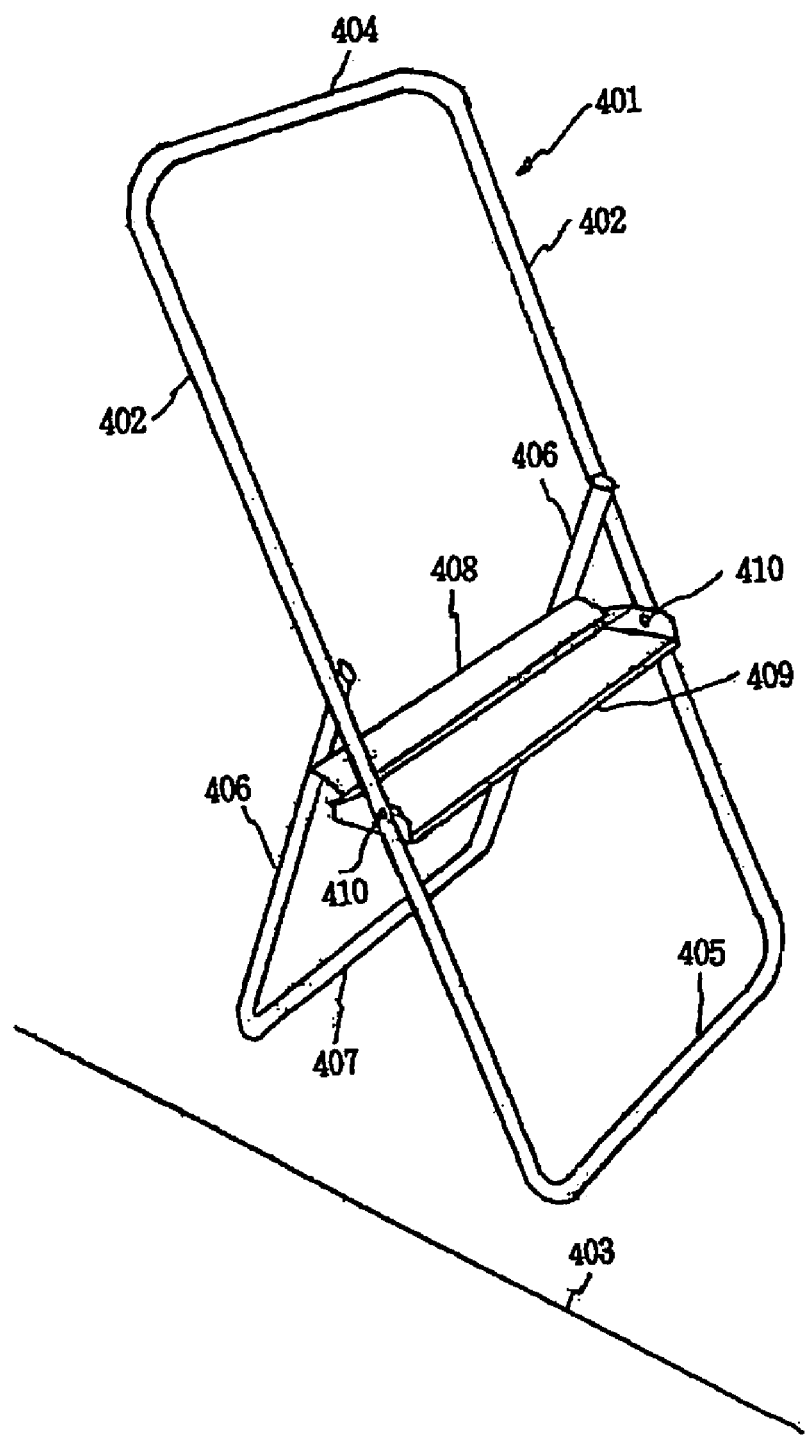
FIG. 17 is a perspective view of a mop squeezer of an fourth embodiment according to the present invention.
Figure 18:
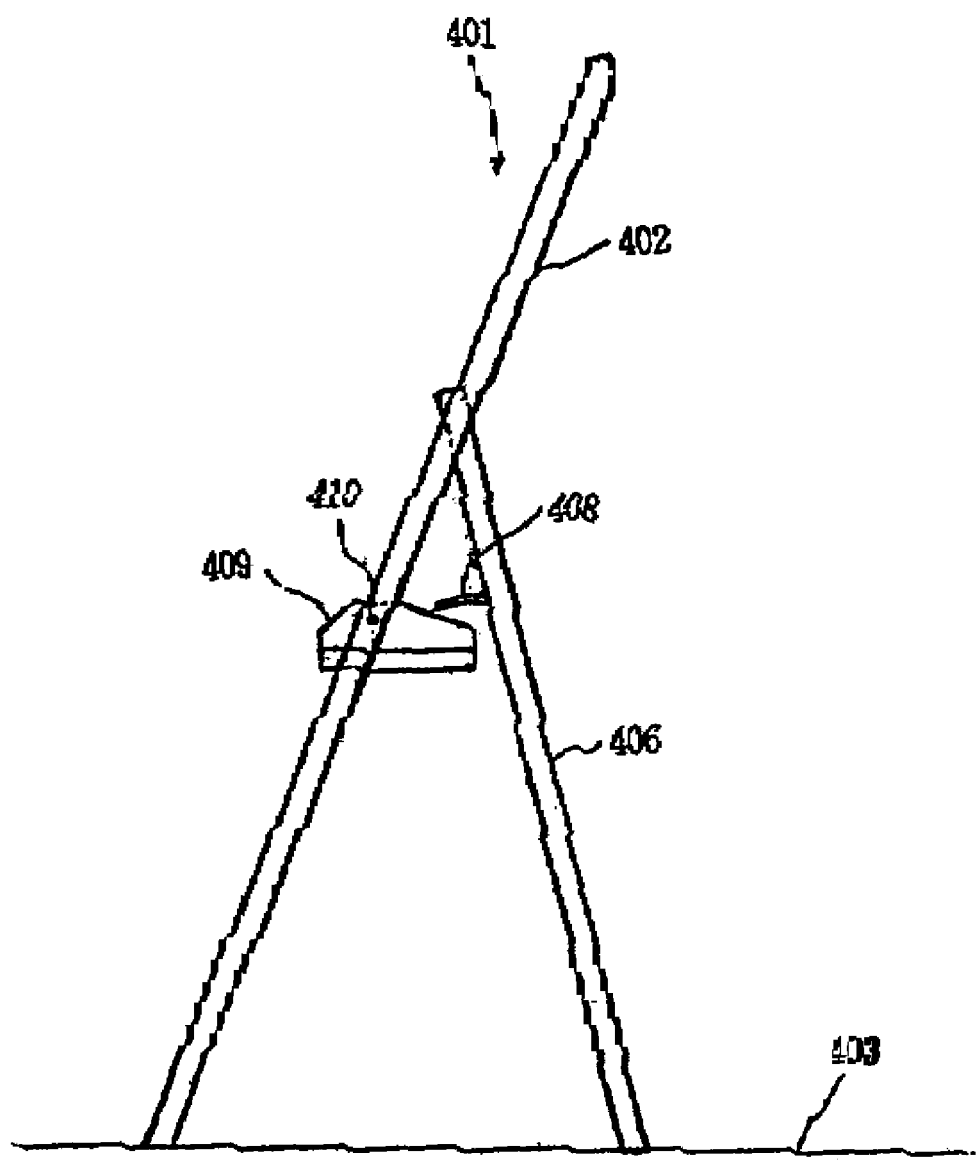
FIG. 18 is a side view of the mop squeezer of FIG. 17.
Figure 19:
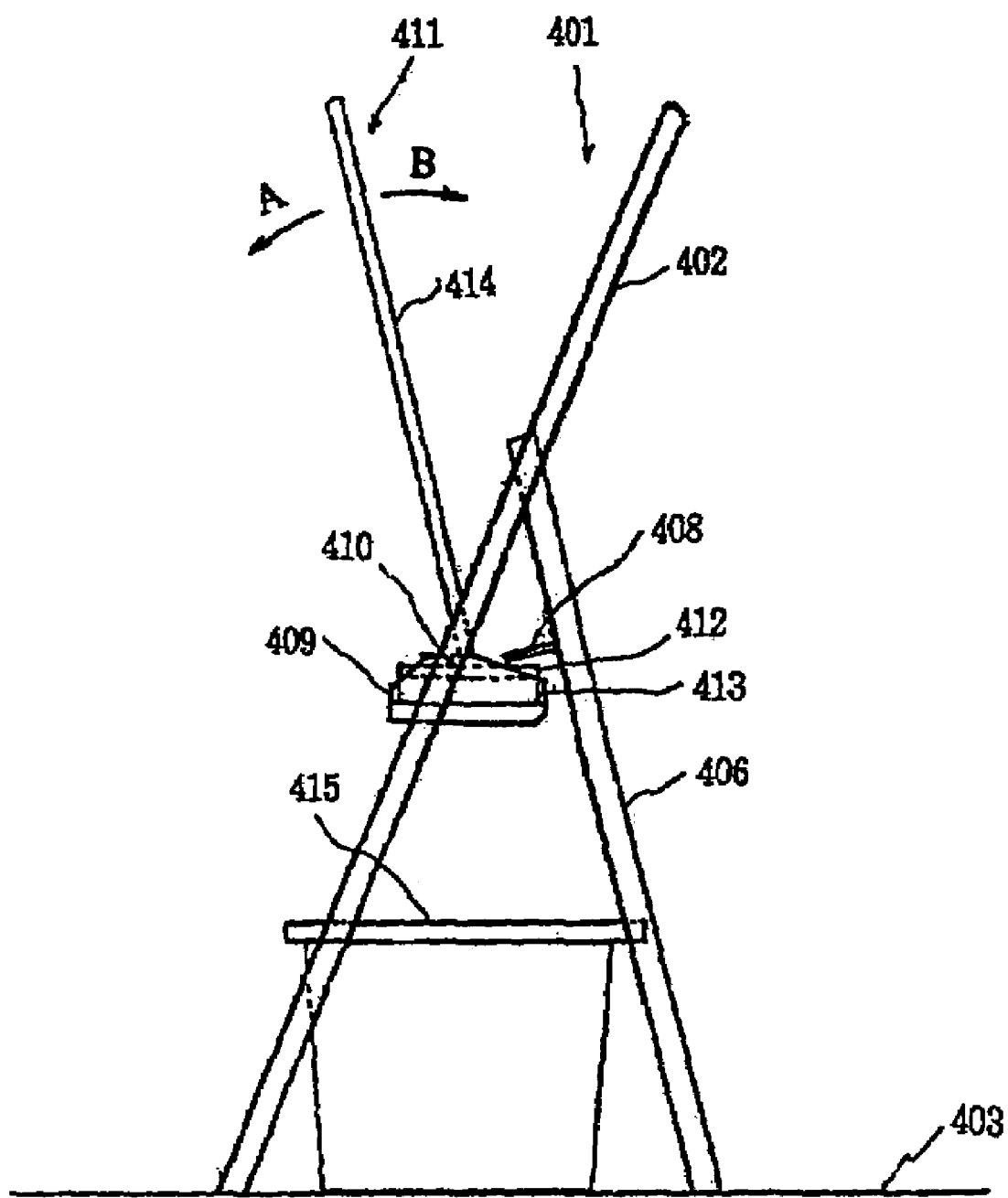
FIG. 19 is a function explanatory view of the mop squeezer of FIG. 17.

FIG. 17 is a perspective view, FIG. 18 is a side view and FIG. 19 is a function explanatory view, all of the fourth embodiment.

Figure 26:
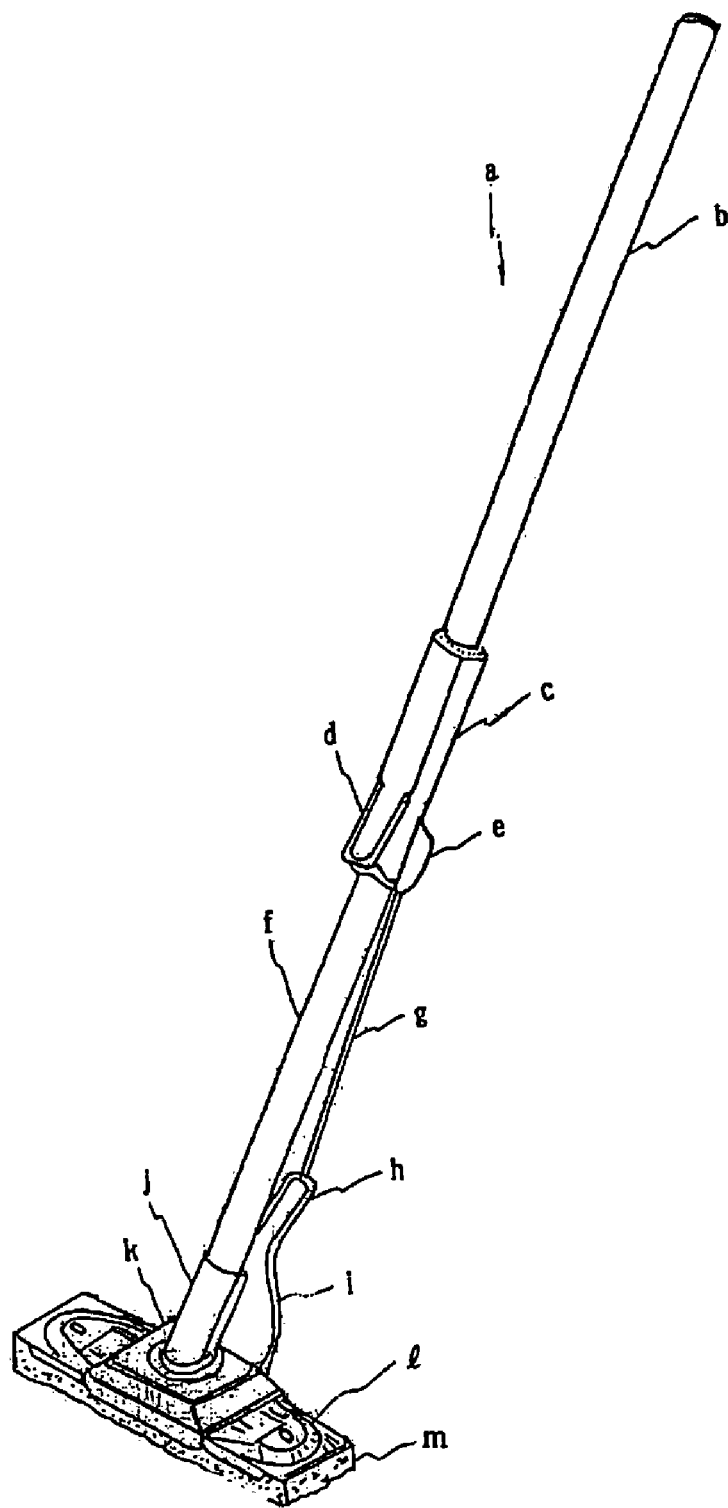
FIG. 26 is a perspective view of a mop with sponge in the prior art.
Figure 27:
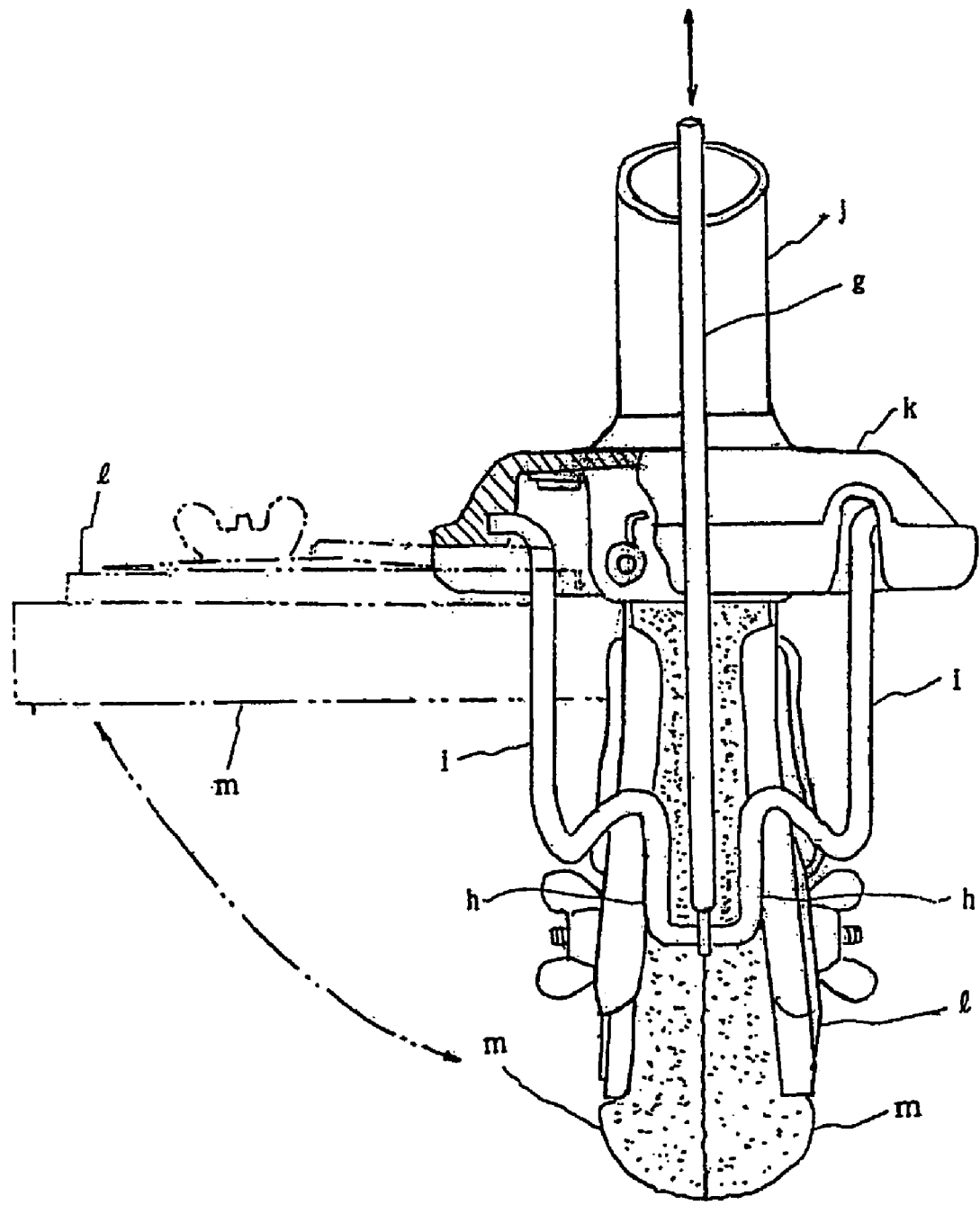
FIG. 27 is an enlarged perspective view of a mop portion of the mop with sponge in the prior art.

In FIGS. 17 to 19, numeral 401 designates the mop squeezer, numerals 402 designate frame members that are provided substantially in parallel to each other and inclinedly relative to a floor 403, numeral 404 designates an upper frame pipe that connects upper ends of the frame members 402 to each other and numeral 405 designates a lower frame pipe that connects lower ends of the frame members 402 to each other. Numerals 406 designate struts that are fixedly provided at a middle position of the frame members 402 so as to make an acute angle between themselves and the frame members 402. Numeral 407 designates a lower frame pipe that connects lower ends of the struts 406 to each other. Numeral 408 designates a presser plate that is fixed to the struts 406 and numeral 409 designates a receiver plate that is fitted to the frame members 402 rotatably around pins 410. The gap between the presser plate 408 and the receiver plate 409 is set to such a size as is slightly smaller than a thickness of the mop with sponge in the prior art shown in FIGS. 26 and 27. In FIG. 19, numeral 411 designates a mop with sponge that comprises a metal plate 412, a sponge mop pad 413 and a handle 414. Numeral 415 designates a water tank.

In the fourth embodiment constructed as mentioned above, sponge mop pad 413 together with the metal plate 412 of the mop with sponge 411 is placed on the receiver plate 409 so as to be inserted into the gap between the presser plate 408 and the receiver plate 409. When the handle 414 is rotated in the direction of arrow A in FIG. 19, the receiver plate 409 is also rotated so that the sponge mop pad 413 is compressed between the presser plate 408 and the receiver plate 409. Thus, the water contained in the sponge mop pad 413 is squeezed off to be appropriately adjusted. Then, the handle 414 is rotated in the direction of arrow B and the sponge mop pad 413 together with the metal plate 412 is taken out from between the presser plate 408 and the receiver plate 409 to be ready for the next wiping.

In this case, a considerable force is required to move the handle 414 in the direction of arrow C in FIG. 19 for squeezing the wash water contained in the sponge mop pad 413.

In the conventional case, it has been necessary to design the water tank so that it has an enough strength for withstanding a strong force added to the handle 414. In the present embodiment, however, the strong force added to the handle 414 is conveyed to the strut 406 via the presser plate 408 and to the frame member 402 via the receiver plate 409, and thus to the entire mop squeezer 401. Hence, it is not necessary to make the water tank 415 strengthened so as to stand the strong force added to the handle 414.

Next, a mop squeezer of a fifth embodiment according to the present invention will be described with reference to FIGS. 20 and 21. Both of FIGS. 20 and 21 are side views of the fifth embodiment, wherein FIG. 21 shows the state where the mop squeezer is folded.

Figure 20:
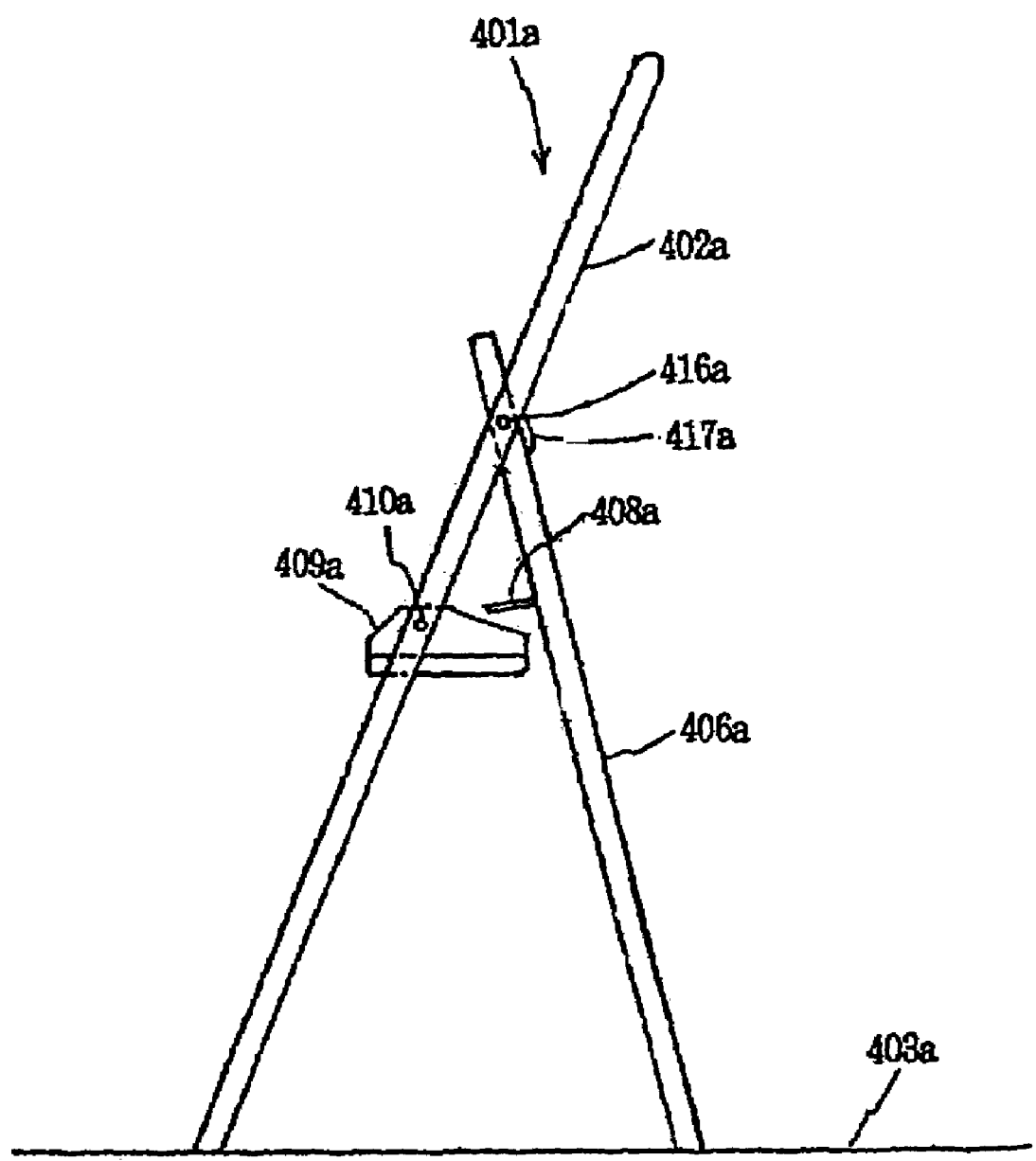
FIG. 20 is a side view of a mop squeezer of a fifth embodiment according to the present invention.
Figure 21:
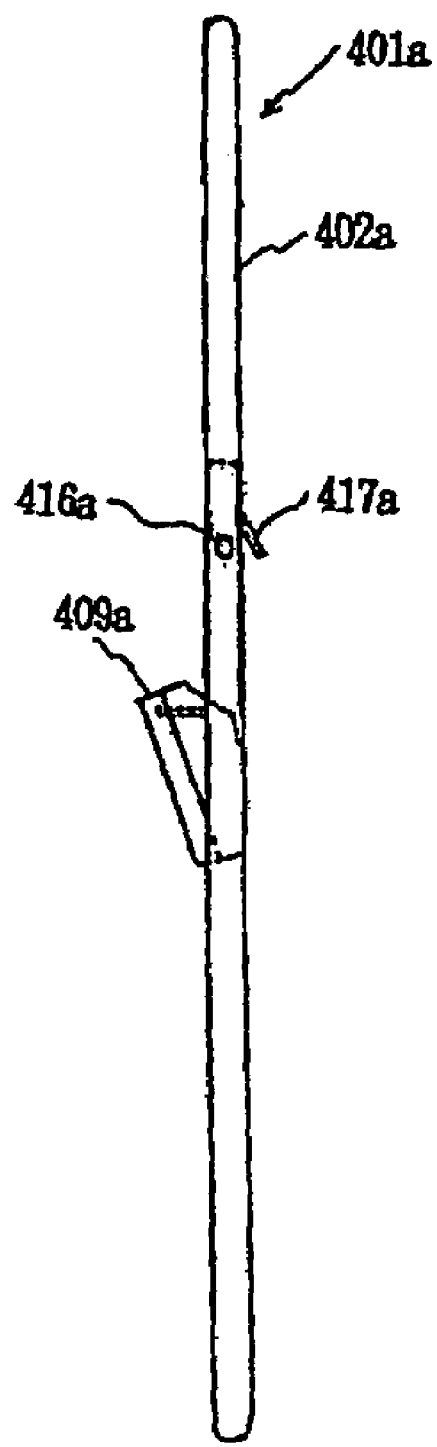
FIG. 21 is a side view of the mop squeezer of FIG. 20 showing the state where the mop squeezer is folded.

In FIGS. 20 and 21, reference numerals 401a to 403a, 406a and 408a to 410a designate the same parts and components, respectively, as those shown by reference numerals 401 to 403, 406 and 408 to 410 in FIGS. 17 to 19 and repeated description thereof will be omitted.

In FIGS. 20 and 21, numeral 416a designates a pin, around which the frame member 402a and the strut 406a are rotatably supported and numeral 417a designates a stopper that stops the strut 406a against the frame member 402a so that an acute angle is formed between the frame member 402a and the strut 406a.

In the fifth embodiment constructed as mentioned above, during the work, the mop squeezer is used while the frame member 402a and the strut 406a keep the acute angle, as shown in FIG. 20. When the work is finished or otherwise during the time out of work, the strut 406a is folded to the frame member 402a, as shown in FIG. 21, so that the mop squeezer is easily transported or is kept aside.

Figure 22:
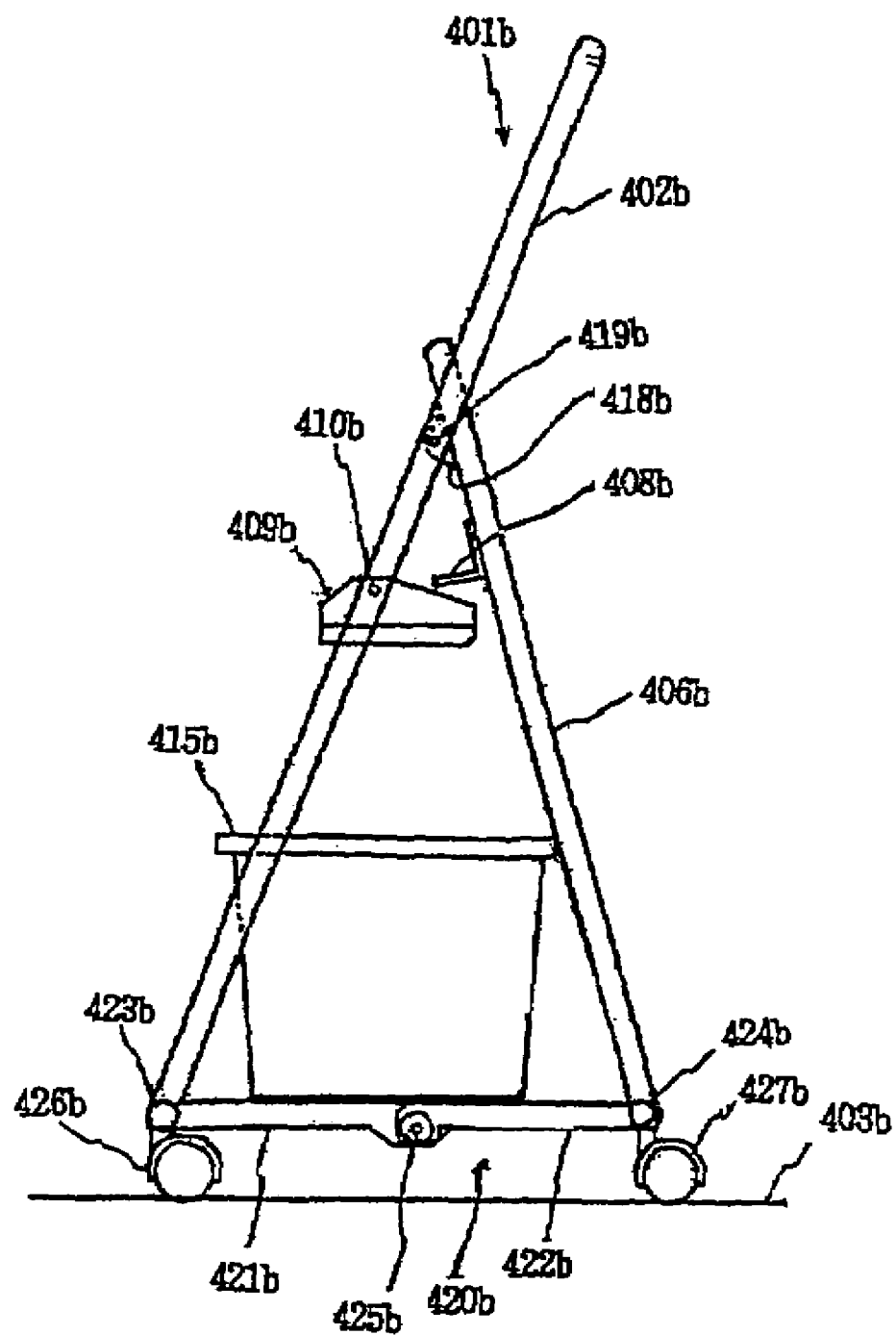
FIG. 22 is a side view of a mop squeezer of a sixth embodiment according to the present invention.

Further, a mop squeezer of a sixth embodiment according to the present invention will be described with reference to FIGS. 22 to 24. FIG. 22 is a side view thereof, FIG. 33 is a front view thereof and FIG. 24 is a side view showing the state where the mop squeezer is folded.

Figure 23:
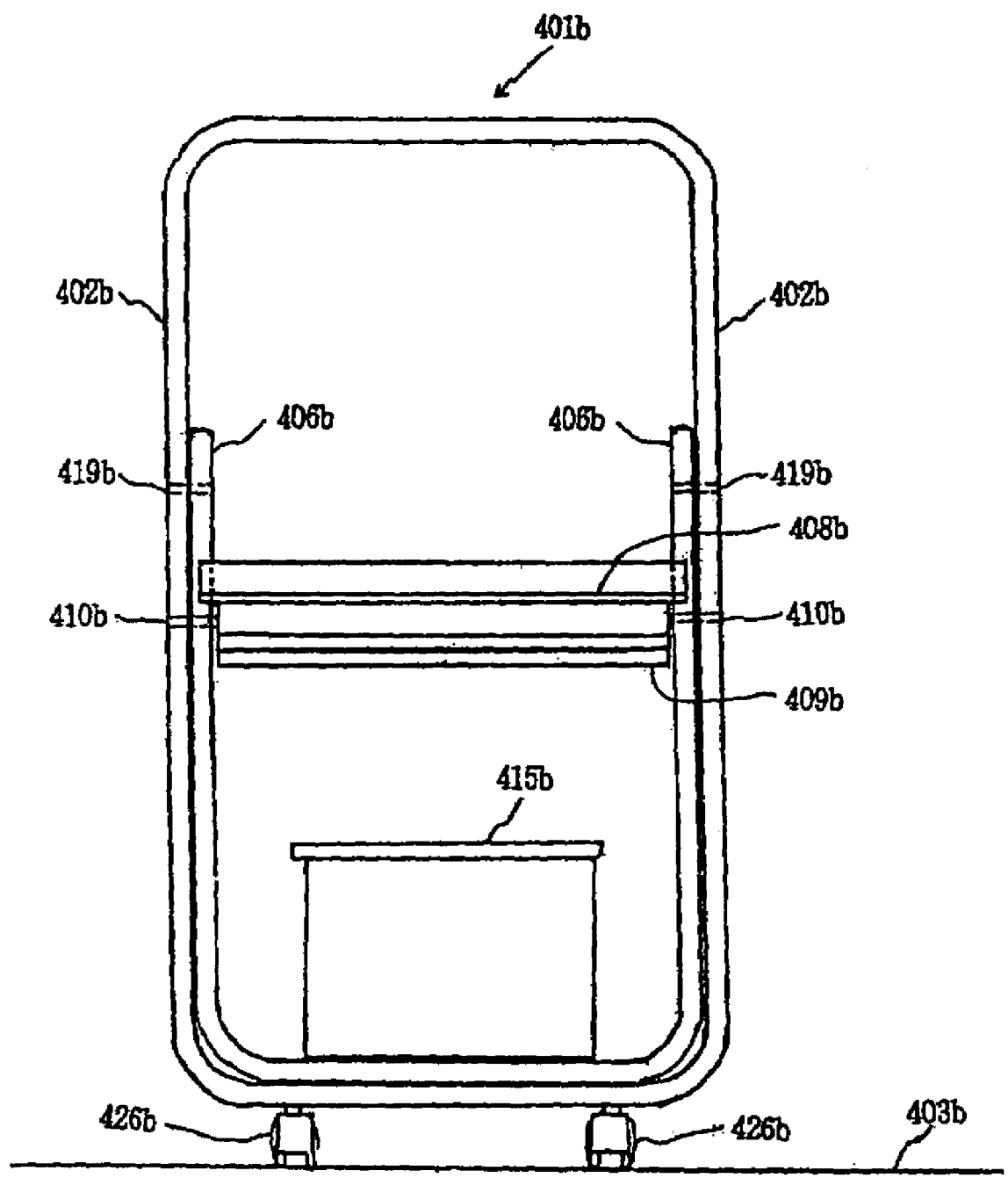
FIG. 23 is a front view of the mop squeezer of FIG. 22.
Figure 24:
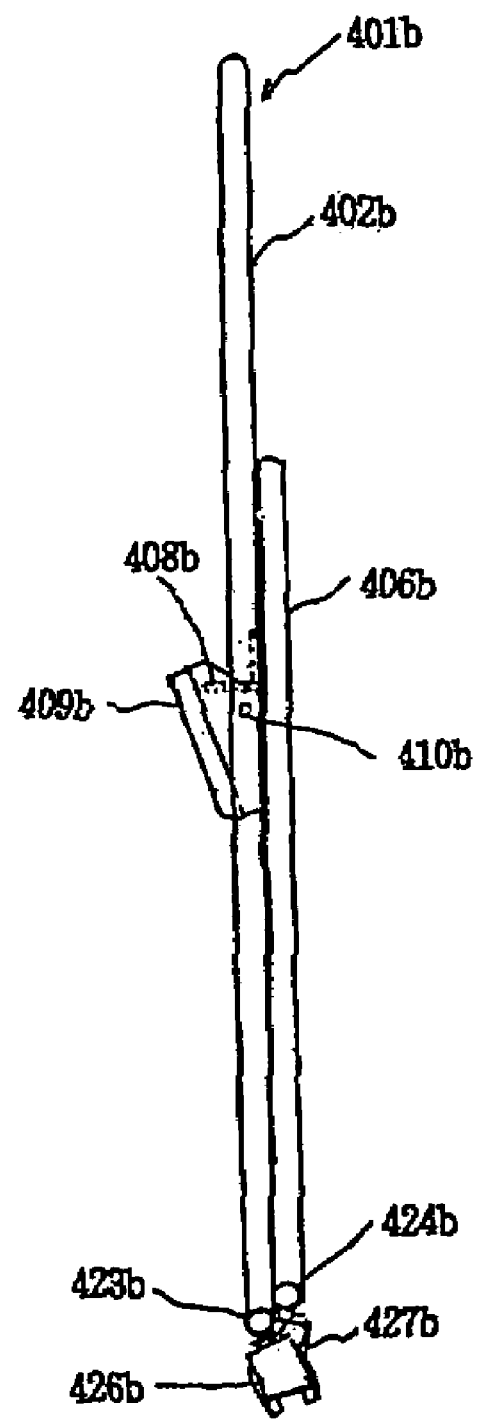
FIG. 24 is a side view of the mop squeezer of FIG. 32 showing the state where the mop squeezer is folded.

In FIGS. 22 to 24, reference numerals 401b to 403b, 406b, 409b, 410b and 415b designate the same parts and components, respectively, as those shown by reference numerals 401 to 403, 406, 409, 410 and 415 in FIGS. 17 to 19 and repeated description thereof will be omitted.

In FIGS. 22 to 24, numeral 418b designates a rotation jig, by which the frame member 402b and the strut 406b are rotatably supported, numeral 419b designates a pin and numeral 420b designates a bottom portion of the mop squeezer 401b that exists between a lower end portion of the frame member 402b and a lower end portion of the strut 406b. This bottom portion 420b is surrounded by a hinge mechanism that comprises a frame member side bottom plate 421b, a strut side bottom plate 422b, a pin 423b rotatably connecting the frame member 402b to the frame member side bottom plate 421b, a pin 424b rotatably connecting the strut 406b to the strut side bottom plate 422b and a pin 425b rotatably connecting the frame member side bottom plate 421b and the strut side bottom plate 422b to each other. Numerals 426b, 427b designate casters fitted to the lower ends of the frame member 402b and the strut 406b.

In the sixth embodiment constructed as mentioned above, during the work, the mop squeezer is used while the frame member 402b and the strut 406b keep the acute angle, as shown in FIG. 22.

When the work is finished at a predetermined place, the mop squeezer is moved to a next place to be wiped using the casters 426b, 427b. When the work is finished or otherwise during the time out of work, the strut 406b is folded to the frame member 402b, as shown in FIG. 24, so that the mop squeezer is easily transported or is kept aside.

Figure 25:
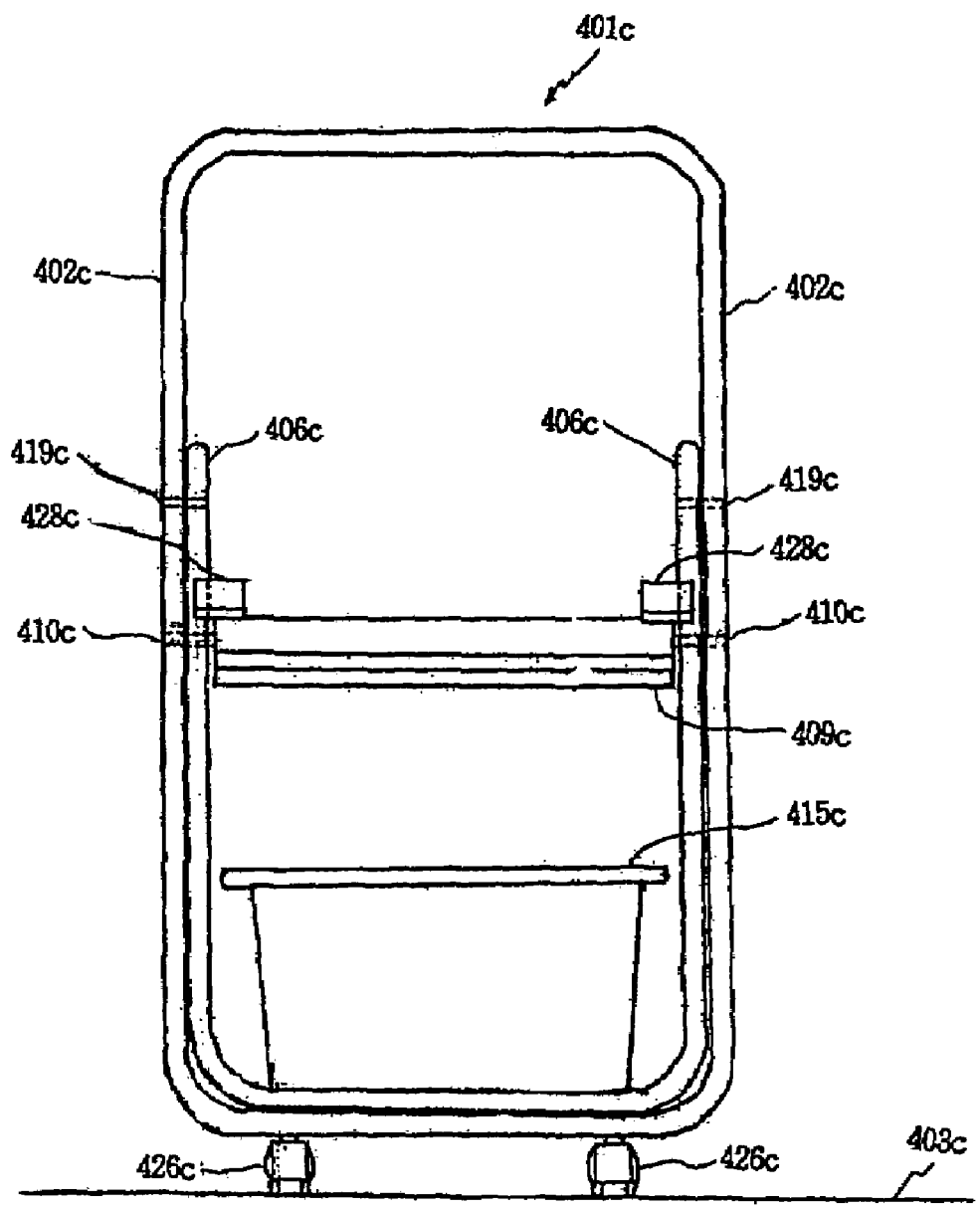
FIG. 25 is a front view of a mop squeezer of an seventh embodiment according to the present invention.

Finally, a mop squeezer of a seventh embodiment according to the present invention will be described with reference to FIG. 25. FIG. 25 is a front view of the eleventh embodiment.

In FIG. 25, reference numerals 401c to 403c, 406c, 409c, 410c, 415c, 419c and 426c designate the same parts and components, respectively, as those shown by reference numerals 401b to 403b, 406b, 409b, 410b, 415b, 419b and 426b in FIG. 24 and repeated description thereof will be omitted.

In FIG. 25, numerals 428c, 428c designate presser plate pieces that are fitted to the struts 406c, 406c.

In the seventh embodiment constructed as mentioned above, if a sponge mop pad having an extended width is used, a metal plate of the extended width holding the sponge mop pad is engaged at both end portions of the metal plate with the presser plate pieces 428c, 428c. Thus, the sponge mop pad is compressed between the metal plate and the receiver plate 409c and water contained in the sponge mop pad is squeezed off so that a predetermined water content is realized.

INDUSTRIAL APPLICABILITY

As mentioned above, the mop and the mop squeezer of the present invention has the applicability as follows:

1. As the water contained in the sponge mop pad after being washed by the wash water can be easily squeezed off by application of the lever using the handle of the mop, the cleaning work can be done comfortably even by women workers having less physical power.

2. As the sponge mop pad is not of the type that is folded at the middle position so as to squeeze off the water contained therein, deterioration of the sponge mop pad can be avoided.

3. As the water contained in the sponge mop pad is squeezed off by the homogenous force added to the entire surface of the sponge mop pad, the water content in the sponge mop pad after being squeezed becomes homogenous over the entire sponge mop pad and no irregularity in the wiping is caused.

4. As the structure of the mop and/or the mop squeezer is simple, it can be easily changed to a larger size or to a smaller size so as to be widely applied not only to the industrial field but also to use in the home.

5. While the conventional cleaning in a hospital etc. has been done in three steps, that is, sweeping by a broom, wiping by a dust mop and wiping by water, the mop and/or the mop squeezer of the present invention enables cleaning by one step, thereby remarkably reducing the cost of man power required for the cleaning.

6. As the cleaning, especially in a hospital, can be done by the sponge mop pad having the homogenous water content, the water on the floor after the cleaning is dried in a short time, which is effective for avoidance of internal infection in the hospital.

7. As the sponge mop pad is squeezed directly above the water tank, there is no scattering of the water that is squeezed off, which is preferable for sanitary purposes.

8. As the squeezing mechanism is made very simple such that the sponge mop pad is compressed by the metal plate of the mop that is rotated around the fulcrum defined as the contact line of the metal plate and the presser plate of the water tank, the squeezing work of the mop is very simple.

9. While the conventional water tank has been designed to have a high strength so as to withstand the large force required for squeezing off the wash water contained in the mop, this is not necessary in the present invention.

10. For the same reason as in Item 9 above, the water tank can be made to be light weight.

11. As the squeezing mechanism of the sponge mop pad is very simple, manufacture of the mop squeezer is very easy.

12. As the structure of the unit is simple as compared with the conventional unit, the mop squeezer of the sponge mop pad can be made less costly.

13. As the hinge mechanism enables a compact size of the mop squeezer, when folded, transportation and maintenance thereof can be done easily.

The invention claimed is:

1. A mop squeezer for squeezing wash water contained in a sponge mop pad fitted on a mop, said mop squeezer comprising:
   a receiver plate mounted so as to be rotatable;
   a presser plate spaced apart from said receiver plate;
   a strut protruding through said receiver plate and said presser plate such that a first end of said strut protrudes through said presser plate to form a first protruding portion, and a second end of said strut protrudes through said receiver plate to form a second protruding portion, said strut being arranged such that a gap is formed between said receiver plate and said presser plate; and
   a spring positioned on at least one of said first protruding portion and said second protruding portion;
   said receiver plate and said presser plate having a structure and being arranged with respect to each other so that when the sponge mop pad, attached to a rigid body, is inserted into the gap between said receiver plate and said presser plate in a forward direction, a fulcrum is formed at an interface of a front end portion of the rigid body and a rear end portion of said presser plate, and when a handle of the mop is pressed down, a gap between said receiver plate and and the fulcrum is changed, and the sponge mop pad is compressed.

2. A mop squeezer as claimed in claim 1, further comprising:
   a cylindrical member arranged to support said receiver plate.

3. A mop squeezer as claimed in claim 2, wherein said cylindrical member is rotatable.

4. A mop squeezer for squeezing wash water contained in a sponge mop pad fitted on a mop, said mop squeezer comprising:
   a receiver plate mounted so as to be rotatable;
   a presser plate spaced apart from said receiver plate;
   a strut protruding through said receiver plate and said presser plate such that a first end of said strut protrudes through said presser plate to form a first protruding portion, and a second end of said strut protrudes through said receiver plate to form a second protruding portion, said strut being arranged such that a gap is formed between said receiver plate and said presser plate;
   a spring positioned on at least one of said first protruding portion and said second protruding portion; and
   a cylindrical member arranged to support said receiver plate, wherein said presser plate is mounted so as to be pivotable about a fixed point, and wherein said receiver plate and said presser plate have a structure and are arranged with respect to each other so that when the sponge mop pad is inserted into the gap between said receiver plate and said presser plate in a forward direction, and a handle of the mop is pressed down, the gap between said receiver plate and said presser plate is narrowed, and the sponge mop pad is compressed.

5. A mop squeezer for squeezing wash water contained in a sponge mop pad fitted on a mop, said mop squeezer comprising:
   two frame members;
   two struts, each of said struts being fitted to a respective one of said frame members such that an acute angle is formed between each of said struts and a respective one of said frame members;
   a presser connected to said struts; and
   a receiver plate pivotally connected between said frame members and below said presser such that a gap between said presser and said receiver plate is smaller than a thickness of the sponge mop pad to be inserted into said mop squeezer, said presser and said receiver plate having a structure and being arranged with respect to each other so that when the sponge mop pad is inserted into the gap between said receiver plate and said presser, and a handle of the mop is pressed down, the gap between said receiver plate and said presser is narrowed and the sponge mop pad is compressed.

6. A mop squeezer as claimed in claim 5, wherein each of said struts is pivotally connected to a respective one of said frame members such that the angle between each of said struts and a respective one of said frame members is adjustable from zero degrees to an acute angle.

7. A mop squeezer as claimed in claim 6, further comprising:
   a lower frame fixing member connected to lower end portions of said frame members;
   a lower strut fixing member connected to lower end portions of said struts; and
   a hinge mechanism connecting said struts and said frame members.

8. A mop squeezer as claimed in claim 7, wherein said presser is a presser member.

9. A mop squeezer as claimed in claim 7, wherein said presser is a presser piece fixed to each of said struts.

10. A mop squeezer as claimed in claim 6, wherein said presser is a presser member.

11. A mop squeezer as claimed in claim 6, wherein said presser is a presser piece fixed to each of said struts.

12. A mop squeezer as claimed in claim 5, wherein said presser is a presser member.

13. A mop squeezer as claimed in claim 5, wherein said presser is a presser piece fixed to each of said struts.

* * * * *